(12) United States Patent
Kameyama

(10) Patent No.: US 8,406,742 B2
(45) Date of Patent: *Mar. 26, 2013

(54) CELLULAR TELEPHONE SET AND CHARACTER DISPLAY PRESENTATION METHOD TO BE USED IN THE SAME

(75) Inventor: Hidehiko Kameyama, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/468,903

(22) Filed: May 10, 2012

(65) Prior Publication Data

US 2012/0220345 A1    Aug. 30, 2012

Related U.S. Application Data

(63) Continuation of application No. 12/465,969, filed on May 14, 2009, now Pat. No. 8,200,197, which is a continuation of application No. 10/671,547, filed on Sep. 29, 2003, now Pat. No. 7,551,946.

(30) Foreign Application Priority Data

Oct. 4, 2002    (JP) .................................. 2002-292604

(51) Int. Cl.
*H04M 1/725*    (2006.01)
*H04M 1/00*    (2006.01)
(52) U.S. Cl. .................... 455/412.1; 455/566; 455/575.3
(58) Field of Classification Search ........................ None
See application file for complete search history.

(56) References Cited

U.S. PATENT DOCUMENTS

| | | |
|---|---|---|
| 5,856,830 A | 1/1999 | Yamamoto |
| 5,870,683 A | 2/1999 | Wells et al. |
| 6,865,386 B2 | 3/2005 | Aoyama et al. |
| 7,551,946 B2 | 6/2009 | Kameyama |
| 2001/0039193 A1 | 11/2001 | Pan |
| 2001/0046853 A1 | 11/2001 | Aoyama et al. |

FOREIGN PATENT DOCUMENTS

| | | |
|---|---|---|
| JP | 08-314665 A | 11/1996 |
| JP | 10-271559 A | 10/1998 |
| JP | 11-018145 A | 1/1999 |
| JP | 11-65798 | 3/1999 |
| JP | 2000-115304 | 4/2000 |
| JP | 2000-184446 | 6/2000 |
| JP | 2000-278371 A | 10/2000 |
| JP | 2001-119453 | 4/2001 |
| JP | 2001-211247 A | 8/2001 |
| JP | 2001-217903 | 8/2001 |
| JP | 2001-245029 A | 9/2001 |
| JP | 2001-268203 | 9/2001 |
| JP | 2001-282751 | 10/2001 |

(Continued)

OTHER PUBLICATIONS

"Setting of Waiting State Display Scree", NTT Docomo Kabushiki Kaisha, Instruction Manual of Mover N 211I, Chapter of Explanation of Functions, and p. 139, Nov. 2001.

*Primary Examiner* — Erika A Washington
(74) *Attorney, Agent, or Firm* — Sughrue Mion, PLLC

(57) ABSTRACT

A cellular telephone set can increase number of display patterns of animation display without occupying large storage region in the memory and without performing setting operation every time. The character presentation means determines character to be displayed in each event screen upon depression of call release button after telephone calling, depression of call release button after telephone call reception, upon occurrence of at least one of presence of not responded call and newly received mail, and upon variation of state between open state and closed state of the first and second casings, depending upon calling history, time of calling, call arriving history, time of call arrival, and timing of detection of variation of state between open state and closed state of the first and second casing by the detecting means.

3 Claims, 12 Drawing Sheets

FOREIGN PATENT DOCUMENTS

| | | |
|---|---|---|
| JP | 2001-308985 A | 11/2001 |
| JP | 2001-339469 A | 12/2001 |
| JP | 2002-197291 A | 7/2002 |
| WO | 00/25501 | 5/2000 |

FIG. 5A BUILT-IN CHARACTER #1 (FOR NORMAL STATE)

FIG. 5B BUILT-IN CHARACTER #1 (FOR MEMORIAL STATE)

NAME AND TELEPHONE
NUMBER OF COUNTERPART
DURATION OF CALL : △△
MINUTES ○○ SECONDS

SIX CALL ARRIVED

NOT RESPONDED

APRIL 11 (THURS,)
12 : 34

WELCOME

FIG. 10A BUILT-IN CHARACTER #1 (FOR NORMAL STATE)

| NUMBER OF CALLING IN CALLING HISTORY PER CALL RECIPIENT | TIME OF CALLING (MINUTE) | | MESSAGE |
|---|---|---|---|
| | ODD NUMBER | EVEN NUMBER | |
| 1 TO 2 | A1 | A5 | FIXED |
| 3 TO 5 | B2 | B6 | FIXED |
| 6 OR MORE | C3 | C7 | FIXED |

FIG. 10B BUILT-IN CHARACTER #1 (FOR MEMORIAL DAY)

| NUMBER OF CALLING IN CALLING HISTORY PER CALL RECIPIENT | TIME OF CALLING (MINUTE) | | MESSAGE |
|---|---|---|---|
| | ODD NUMBER | EVEN NUMBER | |
| 1 TO 2 | A9 | A9 | FIXED |
| 3 TO 5 | B10 | B10 | FIXED |
| 6 OR MORE | C11 | C11 | FIXED |

FIG. 10C BUILT-IN CHARACTER #2 (FOR NORMAL STATE)

| NUMBER OF CALLING IN CALLING HISTORY PER CALL RECIPIENT | TIME OF CALLING (MINUTE) | | MESSAGE |
|---|---|---|---|
| | ODD NUMBER | EVEN NUMBER | |
| 1 TO 2 | A13 | A17 | FIXED |
| 3 TO 5 | B14 | B18 | FIXED |
| 6 OR MORE | C15 | C19 | FIXED |

FIG. 10D BUILT-IN CHARACTER #2 (FOR MEMORIAL DAY)

| NUMBER OF CALLING IN CALLING HISTORY PER CALL RECIPIENT | TIME OF CALLING (MINUTE) | | MESSAGE |
|---|---|---|---|
| | ODD NUMBER | EVEN NUMBER | |
| 1 TO 2 | A21 | A21 | FIXED |
| 3 TO 5 | B22 | B22 | FIXED |
| 6 OR MORE | C23 | C23 | FIXED |

FIG. 10E DOWNLOADED CHARACTER

| NUMBER OF CALLING IN CALLING HISTORY PER CALL RECIPIENT | TIME OF CALLING (MINUTE) | | MESSAGE |
|---|---|---|---|
| | ODD NUMBER | EVEN NUMBER | |
| 1 TO 2 | DL-A | DL-A | FIXED |
| 3 TO 5 | DL-B | DL-B | FIXED |
| 6 OR MORE | DL-C | DL-C | FIXED |

FIG. 11A BUILT-IN CHARACTER #1 (FOR NORMAL STATE)

| NUMBER OF CALLING IN CALL RECEIVING HISTORY PER CALLER | TIME OF CALLING (MINUTE) | | MESSAGE |
|---|---|---|---|
| | ODD NUMBER | EVEN NUMBER | |
| 1 TO 2 | A1 | A5 | FIXED |
| 3 TO 5 | B2 | B6 | FIXED |
| 6 OR MORE | C3 | C7 | FIXED |

FIG. 11B BUILT-IN CHARACTER #1 (FOR MEMORIAL DAY)

| NUMBER OF CALLING IN CALL RECEIVING HISTORY PER CALLER | TIME OF CALLING (MINUTE) | | MESSAGE |
|---|---|---|---|
| | ODD NUMBER | EVEN NUMBER | |
| 1 TO 2 | A9 | A9 | FIXED |
| 3 TO 5 | B10 | B10 | FIXED |
| 6 OR MORE | C11 | C11 | FIXED |

FIG. 11C BUILT-IN CHARACTER #2 (FOR NORMAL STATE)

| NUMBER OF CALLING IN CALL RECEIVING HISTORY PER CALLER | TIME OF CALLING (MINUTE) | | MESSAGE |
|---|---|---|---|
| | ODD NUMBER | EVEN NUMBER | |
| 1 TO 2 | A13 | A17 | FIXED |
| 3 TO 5 | B14 | B18 | FIXED |
| 6 OR MORE | C15 | C19 | FIXED |

FIG. 11D BUILT-IN CHARACTER #2 (FOR MEMORIAL DAY)

| NUMBER OF CALLING IN CALL RECEIVING HISTORY PER CALLER | TIME OF CALLING (MINUTE) | | MESSAGE |
|---|---|---|---|
| | ODD NUMBER | EVEN NUMBER | |
| 1 TO 2 | A21 | A21 | FIXED |
| 3 TO 5 | B22 | B22 | FIXED |
| 6 OR MORE | C23 | C23 | FIXED |

FIG. 11E DOWNLOADED CHARACTER

| NUMBER OF CALLING IN CALL RECEIVING HISTORY PER CALLER | TIME OF CALLING (MINUTE) | | MESSAGE |
|---|---|---|---|
| | ODD NUMBER | EVEN NUMBER | |
| 1 TO 2 | DL-A | DL-A | FIXED |
| 3 TO 5 | DL-B | DL-B | FIXED |
| 6 OR MORE | DL-C | DL-C | FIXED |

FIG. 12A  BUILT-IN CHARACTER #1 (FOR NORMAL STATE)

| STATE OF CELLULAR TELEPHONE SET | TIME OF OPENNING SET (MINUTE) | | MESSAGE |
|---|---|---|---|
| | ODD NUMBER | EVEN NUMBER | |
| NOT RESPONDED CALL PRESENT | D4 | D8 | FIXED |
| NEWLY RECEIVED MAIL PRESENT | D4 | D8 | FIXED |
| NOT RESPONDED CALL AND NEWLY RECEIVED MAIL PRESENT | D4 | D8 | FIXED |

FIG. 12B  BUILT-IN CHARACTER #1 (FOR MEMORIAL DAY)

| STATE OF CELLULAR TELEPHONE SET | TIME OF OPENNING SET (MINUTE) | | MESSAGE |
|---|---|---|---|
| | ODD NUMBER | EVEN NUMBER | |
| NOT RESPONDED CALL PRESENT | D12 | D12 | FIXED |
| NEWLY RECEIVED MAIL PRESENT | D12 | D12 | FIXED |
| NOT RESPONDED CALL AND NEWLY RECEIVED MAIL PRESENT | D12 | D12 | FIXED |

FIG. 12C  BUILT-IN CHARACTER #2 (FOR NORMAL STATE)

| STATE OF CELLULAR TELEPHONE SET | TIME OF OPENNING SET (MINUTE) | | MESSAGE |
|---|---|---|---|
| | ODD NUMBER | EVEN NUMBER | |
| NOT RESPONDED CALL PRESENT | D16 | D20 | FIXED |
| NEWLY RECEIVED MAIL PRESENT | D16 | D20 | FIXED |
| NOT RESPONDED CALL AND NEWLY RECEIVED MAIL PRESENT | D16 | D20 | FIXED |

FIG. 12D  BUILT-IN CHARACTER #2 (FOR MEMORIAL DAY)

| STATE OF CELLULAR TELEPHONE SET | TIME OF OPENNING SET (MINUTE) | | MESSAGE |
|---|---|---|---|
| | ODD NUMBER | EVEN NUMBER | |
| NOT RESPONDED CALL PRESENT | D24 | D24 | FIXED |
| NEWLY RECEIVED MAIL PRESENT | D24 | D24 | FIXED |
| NOT RESPONDED CALL AND NEWLY RECEIVED MAIL PRESENT | D24 | D24 | FIXED |

FIG. 12E  DOWNLOADED CHARACTER

| STATE OF CELLULAR TELEPHONE SET | TIME OF OPENNING SET (MINUTE) | | MESSAGE |
|---|---|---|---|
| | ODD NUMBER | EVEN NUMBER | |
| NOT RESPONDED CALL PRESENT | DL-D | DL-D | FIXED |
| NEWLY RECEIVED MAIL PRESENT | DL-D | DL-D | FIXED |
| NOT RESPONDED CALL AND NEWLY RECEIVED MAIL PRESENT | DL-D | DL-D | FIXED |

CELLULAR TELEPHONE SET AND CHARACTER DISPLAY PRESENTATION METHOD TO BE USED IN THE SAME

CROSS REFERENCE TO THE RELATED APPLICATIONS

The present application is a continuation of U.S. application Ser. No. 12/465,969, filed May 14, 2009, now U.S. Pat. No. 8,200,197, which is a continuation of U.S. application Ser. No. 10/671,547, filed Sep. 29, 2003, now U.S. Pat. No. 7,551,946, which claims priority based on Japanese Patent Application No. 2002-292604, filed on Oct. 4, 2002. The entire disclosures of the prior applications are hereby incorporated by reference.

BACKGROUND OF THE INVENTION

1. Field of the Invention

The present invention relates generally to a cellular telephone set and a character display presentation method to be used in the same. More particularly, the invention relates to an animation display system in an event screen upon turning ON a power source of the cellular telephone set.

2. Description of the Related Art

Conventionally, among the cellular telephone set, there are some sets providing visual effect for enabling to see conditions at a glance by presenting animation displays set for respective conditions, such as upon waking-up, upon arrival of call, upon calling, upon sending mail, upon reception of mail, upon placement of folding type set in open condition where an upper side casing and a lower side casing are unfolded or opened (in waiting condition) and so forth. Such cellular telephone set has been disclosed in "Setting of Waiting State Display Screen", NTT Docomo Kabushiki Kaisha, Instruction Manual of Mover N211i, Chapter of Explanation of Functions, and page 139, November, 2001.

In this case, as animation display, animation of famous character may be employed, or, in the alternative, animation of the character providing good impression to the user may be employed.

In the conventional cellular telephone set, by setting animation display per respective conditions, such as upon waking-up, upon arrival of call, upon calling, upon sending mail, upon reception of mail and so forth, it becomes possible to display animation of selected character.

However, at every time of changing animation display, setting operation has to be performed. Also, due to restriction of memory capacity mounted for each equipment, large number of characters cannot be stored. Once animation display is set, display of the same pattern of animation is performed every time.

Accordingly, in the conventional cellular telephone set, upon executing animation display of different patterns at every time, setting operation becomes necessary every time of executing animation display. Also, for storing images for many kinds of animation display, large storage region of memory becomes necessary.

SUMMARY OF THE INVENTION

The present invention has been worked out in view of the shortcoming set forth above. It is therefore an object of the present invention to provide a cellular telephone set and a character display presentation method which can increase number of display patterns of animation display without occupying large storage region in a memory and without requiring setting operation at every time.

According to the first aspect of the present invention, a cellular telephone set capable of performing animation display of any one of a preliminarily stored plurality of characters, comprises:

character presentation means for controlling animation display of the character depending upon history information corresponding to an event upon occurrence of the event in the set.

According to the second aspect of the present invention, a cellular telephone set capable of performing animation display of any one of a preliminarily stored plurality of characters, comprises:

character presentation means responsive to occurrence of an event on the set for controlling animation display of the character depending upon history information depending upon an occurrence timing of a predetermined operation relating to the event.

According to the third aspect of the present invention, a character display presentation method of a cellular telephone set capable of performing animation display of any one of a preliminarily stored plurality of characters, comprises:

step of controlling animation display of the character depending upon history information corresponding to an event upon occurrence of the event in the set.

According to the fourth aspect of the present invention, a character display presentation method of a cellular telephone set capable of performing animation display of any one of a preliminarily stored plurality of characters, comprises:

step responsive to occurrence of the event on the set of controlling animation display of the character depending upon history information depending upon an occurrence timing of a predetermined operation relating to the event.

According to the fifth aspect of the present invention, a program for a character display presentation method of a cellular telephone set capable of performing animation display of any one of a preliminarily stored plurality of characters, the program operates a computer for executing a process of controlling animation display of the character depending upon history information corresponding to an event upon occurrence of the event in the set.

According to the sixth aspect of the present invention, a program for a character display presentation method of a cellular telephone set capable of performing animation display of any one of a preliminarily stored plurality of characters, the program operates a computer for executing a process responsive to occurrence of an event on the set, of controlling animation display of the character depending upon history information depending upon an occurrence timing of a predetermined operation relating to the event.

Namely, the cellular telephone set according to the present invention determines character to be displayed in each event screen upon depression of call release button after telephone calling, upon depression of call release button after telephone call reception, upon occurrence of at least one of presence of not responded call and newly received mail, and upon variation of state between open state and closed state of the first and second casings, depending upon calling history, time of calling, call arriving history, time of call arrival, and timing of detection of variation of state between open state and closed state of the first and second casing by the detecting means, and displays the determined character on the display screen.

Discussing more particularly, in the cellular telephone set according to the present invention, the character presentation means determines the appearing character to one of three types depending upon number of the same number (number of calling in the calling history per call recipient) presenting in the calling history, and determines one of two patterns for displaying the character depending upon a time of calling (minutes) (odd number or even number).

On the other hand, in the cellular telephone set according to the present invention, the character presentation means determines the appearing character to one of three types depending upon number of the same number (number of call reception in the call reception history per caller) presenting in the calling history, and determines one of two patterns depending for displaying the character upon a time of call reception (minutes) (odd number or even number).

On the other hand, in the cellular telephone set, the character presentation means displays the character upon depression of call release button after telephone calling, depression of call release button after telephone call reception, upon occurrence of at least one of presence of not responded call and newly received mail, upon variation of state between open state and closed state of the first and second casings, and determines one of two patterns depending upon time (minutes) (odd number or even number) of opening of the set for displaying the character.

On the other hand, in the cellular telephone set, the character presentation means varies display condition in the character display depending upon time (minutes) of opening of the cellular telephone set upon performing character presentation upon variation of state between open state and closed state of the first and second casing by the detecting means.

By this, in the cellular telephone according to the present invention, it becomes possible to increase number of display patterns of animation display without occupying large storage region in the memory and without performing setting operation every time.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIGS. 10A to 10E are illustration showing pattern assignment condition of "calling→talking→call releasing" in the character presentation means of FIG. 1;

FIGS. 11A to 11E are illustration showing pattern assignment condition of "call arrival→talking→call releasing" in the character presentation means of FIG. 1;

FIGS. 12A to 12E are illustration showing pattern assignment condition of "not responded call arrival→new mail" in the character presentation means of FIG. 1;

DESCRIPTION OF THE PREFERRED EMBODIMENT

The present invention will be discussed hereinafter in detail in terms of the preferred embodiment of a cellular telephone set and a character display presentation method to be used in the same, in accordance with the present invention with reference to the accompanying drawings. In the following description, numerous specific details are set forth in order to provide a thorough understanding of the present invention. It will be obvious, however, to those skilled in the art that the present invention may be practiced without these specific details.

Figure 1:
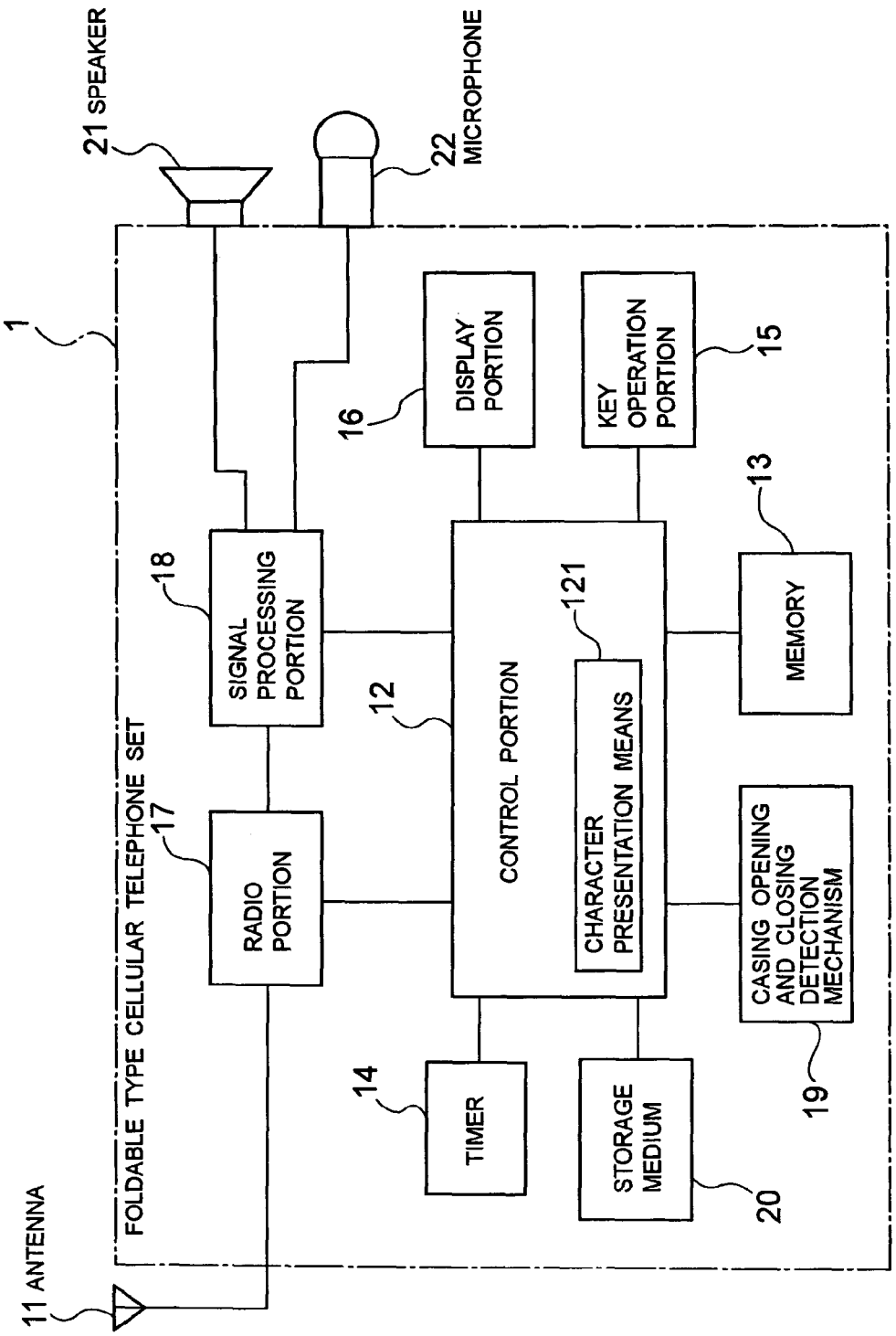
FIG. 1 is a block diagram showing a construction of one embodiment of a cellular telephone set according to the present invention.

FIG. 1 is a block diagram showing a construction of one embodiment of a cellular telephone set according to the present invention. In FIG. 1, a foldable cellular telephone set 1 is constructed with an antenna 11, a control portion 12, a memory 13, a timer 14, a key operating portion 15, a display portion 16, a radio portion 17, a signal processing portion 18, a casing opening and closing detecting mechanism 19, a recording medium 20, a speaker 21 and a microphone 22. An upper side casing (not shown) mounting the display portion 16 and a lower side casing (not shown) mounting a key operating portion 15 are connected for opening and closing by means of a hinge or the like.

It should be noted that while the following disclosure for the shown embodiment will be given in terms of the foldable cellular telephone set, the invention is obviously applicable for the cellular telephone set in which the upper side casing and the lower side casing are integrated, except for process operation in open condition and closed condition of the upper side casing and the lower side casing.

The antenna 11 performs transmission and reception of a radio wave. In the key operating portion 15, user performs various setting, operation of personal identification number or operation of calling and call receiving. The display portion 16 displays operation menu upon performing various setting, operation of personal identification number or operation of calling and call receiving. The radio portion performs process relating to radio transmission and reception. The signal processing portion 18 processes a received signal or a transmission signal. The speaker 21 outputs a received voice and the microphone 22 inputs a voice.

The control portion 12 is connected to the memory 13, the timer, 14, the key operating portion 15, the display portion 16, the radio portion 17 and the signal processing portion 18, respectively for performing control of respective portions. On the other hand, the control portion 12 includes a character presentation means 121 performing animation display upon occurrence of various events, such as wake-up (upon ON-set of power source of the cellular telephone set), call arrival, calling, mail transmission, mail reception, situating the upper side casing and the lower side casing in open condition in case of the foldable type (in waiting) and so forth.

When character presentation function is set ON, the character presentation means 121 displays character and comment (message) in particular event screen. In character presentation, a character [GIF (Graphic Interchange Format) animation] selected through character selecting operation appears on a display screen (not shown) of the display portion 16.

On the other hand, the character presentation means 121 enables downloaded GIP animation to appear. Furthermore, the character presentation means 121 is set so as not to operate when "standard" is selected in character selecting operation.

Opening and closing operation of the upper side casing and the lower side casing are detected by the casing opening and closing detecting mechanism 19. As detection method of opening and closing operation by the casing opening and closing detecting mechanism 19, a method of detecting opening operation and closing operation of the upper side casing and the lower side casing by means of magnets, a method of detecting opening operation and closing operation of the upper side casing and the lower side casing by ON and OFF of a microswitch, and so forth may be employed.

The memory 13 stores contents of various setting, personal identification number and so forth. As actuated by the control portion 12, the timer initiates counting up of elapsed time and notifies time-up to the control portion 12 upon elapse of a designated period. The storage medium 20 stores a program (program executable by a computer) for realizing process of respective portions set forth above and the control portion 12 controls respective portions by executing the program stored in the storage medium 20.

Figure 2:
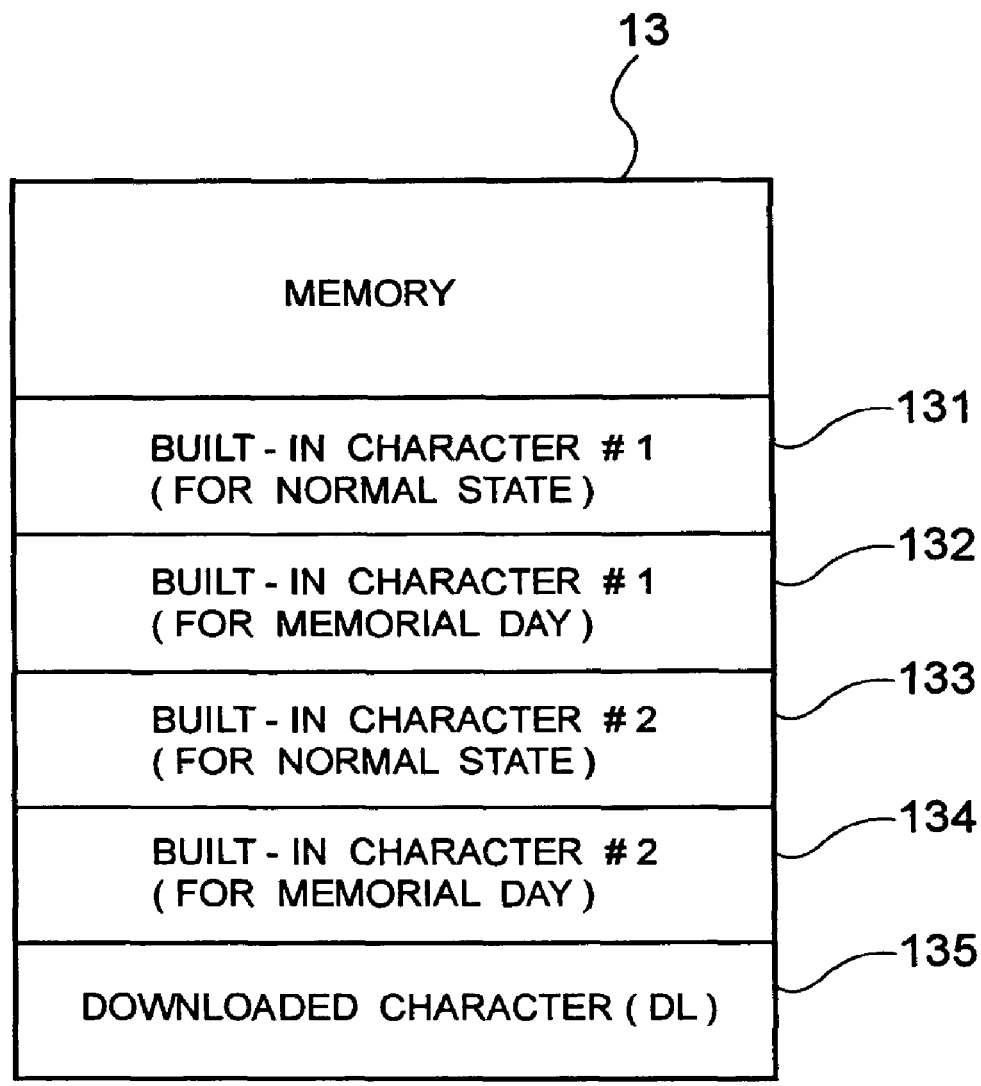
FIG. 2 is an illustration showing an example of structure of a memory of FIG. 1.

FIG. 2 is an illustration showing an example of a structure of the memory 13 of FIG. 1. While FIG. 2 shows a structure of the case where a built-in characters #1 and #2 and downloaded characters can be displayed on the foldable cellular phone set 1, the shown embodiment is applicable even for the case where three or more built-in characters are to be stored by obtaining a storage region therefor.

In FIG. 2, the memory 13 is formed including a storage region 131 for the built-in character #1 (for normal state), a storage region 132 for the built-in character #1 (for memorial day), a storage region 133 for storage region 133 for the built-in character #2 (for normal state), a storage region 134 for the built-in character #2 (for memorial day) and a storage region 135 for the downloaded character.

Figure 3:
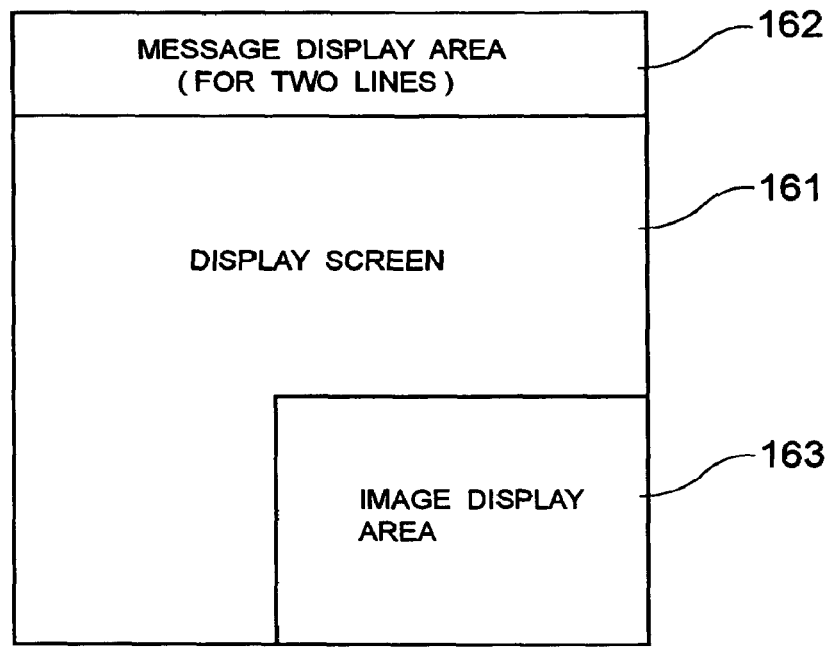
FIG. 3 is an illustration showing one example of a display screen of a display portion of FIG. 1.

FIG. 3 is an illustration showing one example of a display screen of the display portion 16 of FIG. 1. In FIG. 3, the display screen 161 of the display portion 16 comprises a message display area (for two lines) 162 for displaying a message depending upon a condition of the foldable type cellular telephone set 1, and an image display area 163 displaying animating image.

Figure 4:
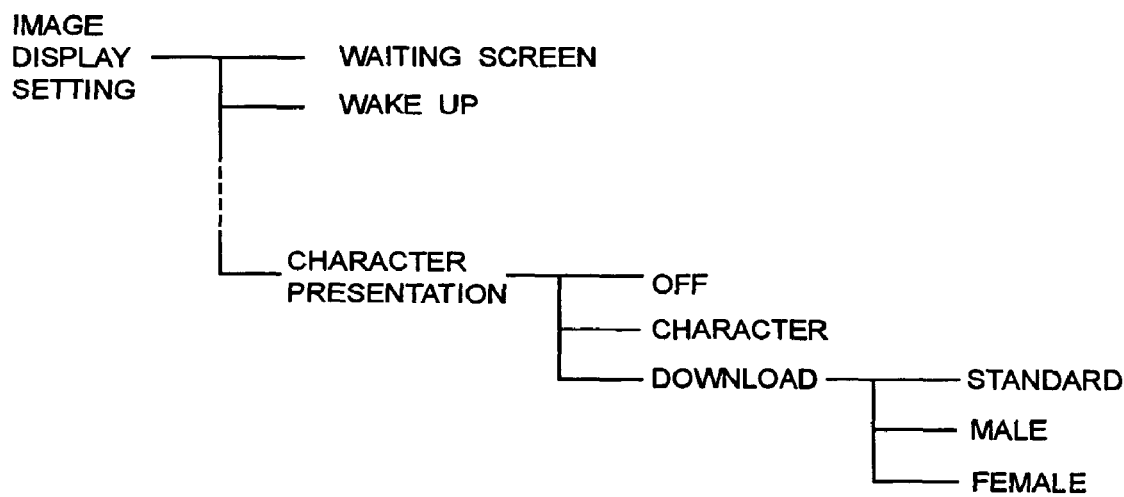
FIG. 4 is an illustration showing a content of function setting for a character presentation means of FIG. 1.

FIG. 4 is an illustration showing a content of function setting for the character presentation means 121 of FIG. 1. In FIG. 4, setting of ON/OFF of the foregoing function for the character presentation means 121 is performed on "screen display setting".

On the screen display setting, items of "waiting screen", "wake-up", . . . , "character presentation" and so forth are contained. Setting of the function by the character presentation means 121 is performed on "character presentation". Setting items of the function in the "character presentation" are three of "OFF", "character" and "download". After selection of "download", selection of message type is required for selection among "standard", "male" and "female".

FIG. 5A is an illustration showing a storage content of the storage region 131 for the built-in character #1 (normal state)" of FIG. 2, and FIG. 5B is an illustration showing a storage content of the storage region 132 for the built-in character #1 (memorial day)" of FIG. 2.

In FIG. 5A, in the storage region 131 for the built-in character #1 (normal state), an image A "for normal state, character #1, pattern #1" (A1), an image B "for normal state, character #1, pattern #1" (B2), an image C "for normal state, character #1, pattern #1" (C3), an image D "for alert state, character #1, pattern #1" (D4), an image A "for normal state, character #1, pattern #2" (A5), an image B "for normal state, character #1, pattern #2" (B6), an image C "for normal state, character #1, pattern #2" (C7), and an image D "for alert, character #1, pattern #2" (D8). While not illustrated, in the storage region 133 of the built-in character #2 (for normal state), the same type data as those in the storage region 131 for the built-in character #1 (for normal state) are stored.

In FIG. 5B, in the storage region 132 for the built-in character #1 (for memorial day), an image A "for normal state, character #1, pattern #3 (limited for memorial day)" (A9), an image B "for normal state, character #1, pattern #3 (limited for memorial day)" (B10), an image C "for normal state, character #1, pattern #3 (limited for memorial day)" (C11) and an image D "for alert, character #1, pattern #3 (limited for memorial day)" (D12) are stored. While not illustrated, in the storage region 134 of the built-in character #2 (for memorial day), the same type data as those in the storage region 132 for the built-in character #1 (for memorial day) are stored.

Figure 6:
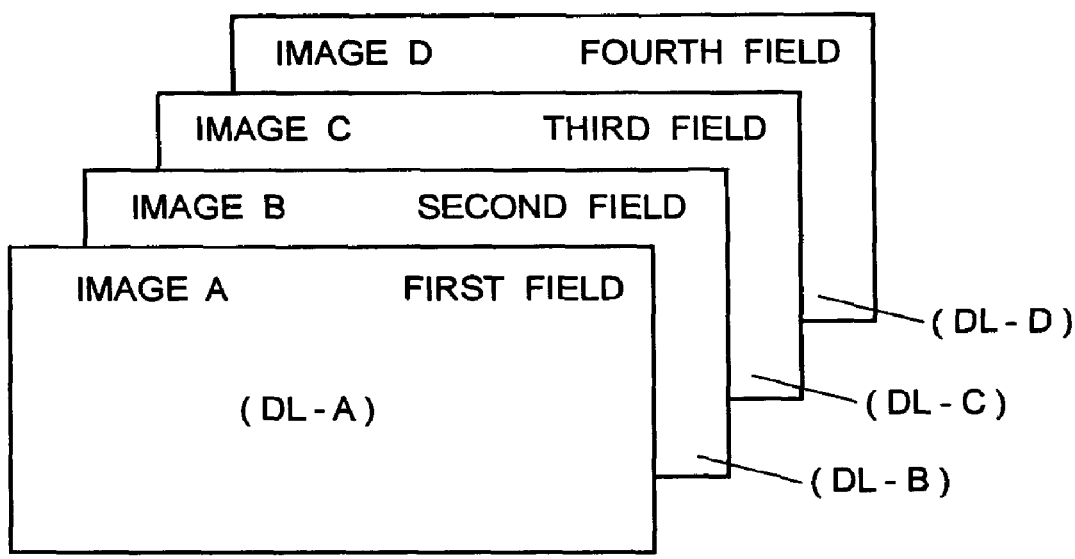
FIG. 6 is an illustration showing a storage content of a storage region of a downloaded character of FIG. 2.

FIG. 6 is an illustration showing the storage content of the storage region 135 of the downloaded character of FIG. 2. In FIG. 6, in the storage region 135 of the downloaded character, an image A, "first field", (DL-A), an image B, "second field", (DL-B), an image C, "third field", (DL-C) and an image D, "fourth field" (DL-D) and so forth are stored.

Figure 7:
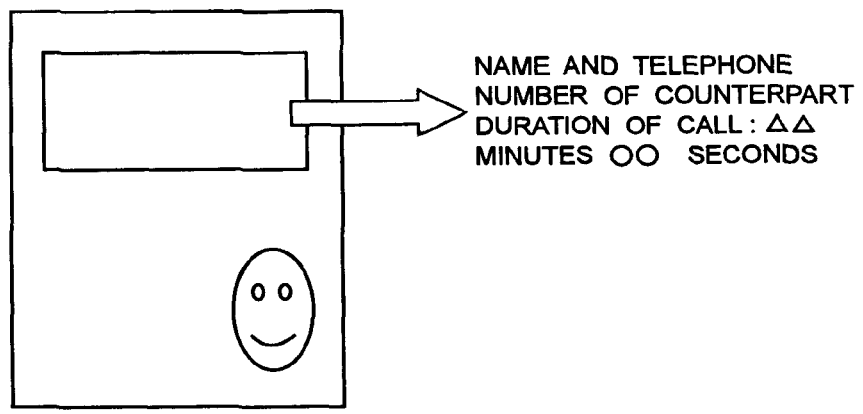
FIG. 7 is an illustration showing an example of display of a display screen of FIG. 3.
Figure 8:
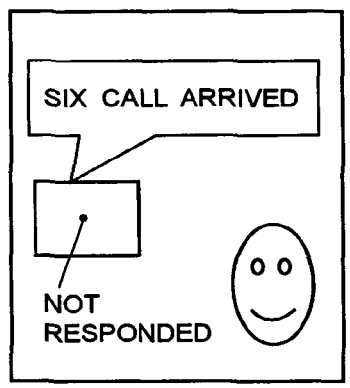
FIG. 8 is an illustration showing an example of display of a display screen of FIG. 3.
Figure 9:
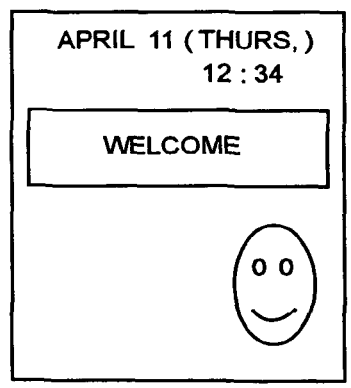
FIG. 9 is an illustration showing an example of display of a display screen of FIG. 3.

FIGS. 7 to 9 are illustrations showing examples of display of the display screen 161 of FIG. 3, respectively. FIGS. 10A to 10E are illustrations showing pattern assignment condition of "calling→talking→call releasing" in the character presentation means 121 of FIG. 1, FIGS. 11A to 11E are illustrations showing pattern assignment condition of "call arriving→talking→call releasing" in the character presentation means 121 of FIG. 1, and FIGS. 12A to 12E are illustrations showing pattern assignment condition of "not responded call arrival→new mail" in the character presentation means 121 of FIG. 1. Character presentation by the character presentation means 121 will be discussed with reference to FIGS. 1 to 12E.

Figure 5:
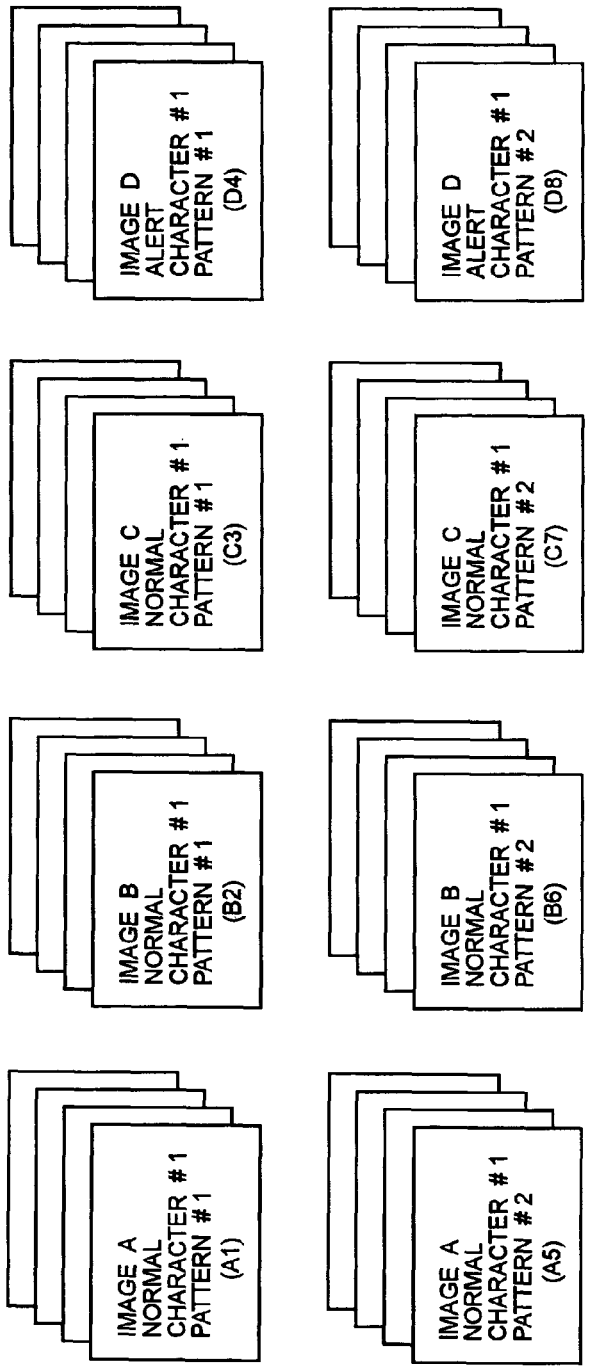
FIG. 5A is an illustration showing a storage content of a storage region of a built-in character (for normal state) of FIG. 2.
FIG. 5B is an illustration showing a storage content of a storage region of a built-in character (for memorial day) of FIG. 2.

When the built-in character is selected, as shown in FIG. 5, pattern #1, pattern #2 and pattern #3 (for memorial day) for the character #1 are presented by the character presentation means 121. Also, in the patterns, four types of characters are provided. For character #2, "three patterns×four types" are provided similarly to the character #1.

On the other hand, the character presentation means 121 is adapted to display messages per respective scenes. These are selectively appeared depending upon number of calling and call arriving number or a time on the cellular telephone set (time of the timer 14).

When the downloaded character is selected, the character presentation means 121 uses the downloaded GIF animation with dividing into four. These are selectively appeared depending upon number of calling and call arriving number or a time on the cellular telephone set (time of the timer 14).

The character presentation means 121 performs character presentation on respective event screen (1) upon pushing down of call release button after calling of telephone, (2) upon pushing down of call release button upon call arrival of telephone, (3) upon presence of not responded calls or new mails and (4) upon situating the upper side casing and the lower side casing from closed state to open state.

In case of the day corresponding to memorial days set by a schedule function, the character presentation means 121 displays a particular character which is stored in the storage region 132 for the built-in character #1 (for memorial day) or storage region 134 of the built-in character #2 (for memorial day).

The character presentation means 121 displays the character and the message according to the assignment table of material (see FIGS. 10A to 12E). The character presentation is turned OFF in response to depression of any key or time-out of five second period.

When character is displayed by the character presentation means 121, display is not transited to the menu screen or so forth by depression of menu button or digit button. On the other hand, the character and comment are displayed on a display position shown in FIG. 3, namely in a message display area 162 and an image display area 163, respectively.

Hereinafter, discussion will be given for display method of respective presentation of the characters in respective event screen of foregoing (1) to (4). In the following discussion, it is assumed that as the characters to be displayed on respective event screens, images stored in the storage region 131 for the built-in character #1 (for normal state) and images stored in the storage region 132 (for memorial days) shown in FIG. 5, images stored in the storage region 135 for downloaded characters shown in FIG. 6 and so forth are used.

Upon depression of call release button after telephone calling and returning to the waiting screen, the character presentation means 121 displays the character in the image display area 163 of the display screen 161. The character presentation means 121 makes judgment for the character to be displayed depending upon calling history and a time upon calling.

The character presentation means 121 determines presentation on the display to any one of three types of appearing character depending upon number of the same number presenting in the calling history (number of calling in the calling history per call recipient) and anyone of two patterns depending upon the time of calling (minutes) (odd number or even number).

Namely, as shown in FIG. 10A, when the built-in character #1 is selected in normal state, if number of calling in the calling history per call recipient is one or two, "A1" is selected when time (minutes) upon calling is odd number, and "A5" is selected when time (minutes) upon calling is even number. If number of calling in the calling history per call recipient is three to five, "B2" is selected when time (minutes) upon calling is odd number, and "B6" is selected when time (minutes) upon calling is even number. If number of calling in the calling history per call recipient is greater than or equal to six, "C3" is selected when time (minutes) upon calling is odd number, and "C7" is selected when time (minutes) upon calling is even number. In the foregoing case, the messages to be displayed become corresponding fixed messages.

As shown in FIG. 10B, when the built-in character #1 is selected and the day corresponds one of the memorial days set by the schedule function, if number of calling in the calling history per call recipient is one or two, "A9" is selected irrespective of odd number or even number of the time (minutes) of calling, if number of calling in the calling history per call recipient is three to five, "B10" is selected irrespective of odd number or even number of the time (minutes) of calling, and if number of calling in the calling history per call recipient is greater than or equal to six, "C11" is selected irrespective of odd number or even number of the time (minutes) of calling. In the foregoing case, the messages to be displayed become corresponding fixed messages.

On the other hand, as shown in FIG. 10C, when the built-in character #2 is selected in normal state, if number of calling in the calling history per call recipient is one or two, "A13" is selected when time (minutes) upon calling is odd number, and "A17" is selected when time (minutes) upon calling is even number, if number of calling in the calling history per call recipient is three to five, "B14" is selected when time (minutes) upon calling is odd number, and "B18" is selected when time (minutes) upon calling is even number, and if number of calling in the calling history per call recipient is greater than or equal to six, "C15" is selected when time (minutes) upon calling is odd number, and "C19" is selected when time (minutes) upon calling is even number. In the foregoing case, the messages to be displayed become corresponding fixed messages.

As shown in FIG. 10D, when the built-in character #2 is selected and the day corresponds one of the memorial days set by the schedule function, if number of calling in the calling history per call recipient is one or two, "A21" is selected irrespective of odd number or even number of the time (minutes) of calling, if number of calling in the calling history per call recipient is three to five, "B22" is selected irrespective of odd number or even number of the time (minutes) of calling, and if number of calling in the calling history per call recipient is greater than or equal to six, "C23" is selected irrespective of odd number or even number of the time (minutes) of calling. In the foregoing case, the messages to be displayed become corresponding fixed messages.

Furthermore, as shown in FIG. 10E, when the downloaded character is selected, if number of calling in the calling history per call recipient is one or two, "DL-A" is selected irrespective of odd number or even number of the time (minutes) of calling, if number of calling in the calling history per call recipient is three to five, "DL-B" is selected irrespective of odd number or even number of the time (minutes) of calling, and if number of calling in the calling history per call recipient is greater than or equal to six, "DL-C" is selected irrespective of odd number or even number of the time (minutes) of calling. In the foregoing case, the messages to be displayed become corresponding fixed messages.

Upon depression of the call releasing button after telephone call arrival or returning to the waiting screen, the character presentation means 121 displays the character on the image display area 163 of the display screen 161. The character presentation means 121 makes judgment of the character to be displayed depending upon call arrival history and time of call arrival.

The character presentation means 121 determines presentation on the display to any one of three types of appearing character depending upon number of the same number presenting in the calling history (number of calling in the calling history per call recipient) and any one of two patterns depending upon the time of calling (minutes) (odd number or even number).

Upon depression of the call releasing button after telephone call arrival and returning to the waiting screen, the character to be displayed on the image display area 163 of the display screen 161 is the same as the character after telephone calling (character shown in FIGS. 10A to 10E) as shown in FIGS. 11A to 11E.

As shown in FIG. 7, the foregoing characters and messages are displayed in the message display area 162 and the image display area 163 of the display screen 161 after telephone calling and after telephone call arrival. In FIG. 7, as message, together with the character, "name and telephone number of counterpart of call", "talk time was ΔΔ minutes and ○○ seconds". In this case, as the message, word selection may be varied depending upon kind of the character ("standard", "male" and "female") or dialec may also be used. On the other hand, in case of caller number not noticed (caller number unnoticed setting, notice impossible, public telephone), information of counterparty of call is not displayed and only duration of call is displayed.

It should be noted that upon returning to the waiting screen after telephone calling set forth above or upon returning to the waiting screen after telephone call arrival, preference is given for information display from respective networks so that character presentation is not performed when message display, display of duration of call, reason display and so forth.

When not responded call is present, when newly received mail is present, and when the upper side casing and the lower side casing are situated from closed condition to open condition by the casing opening and closing detecting mechanism 19, the character presentation means 121 performs character display with determining any one of two patterns of the character depending upon time (minutes) (odd number or even number) while the cellular telephone is opened. It should be noted that the character presentation means 121 does not display even when the upper side casing and the lower side casing are in open condition, and not responded call or the newly received mail is present.

Namely, as shown in FIG. 12A, when the built-in character #1 is selected in normal state, if state of the cellular telephone set is "not responded call present", "D4" is selected when time (minutes) upon calling is odd number, and "D8" is selected when time (minutes) upon calling is even number. If the state of the cellular telephone set is "newly received mail present", "D4" is selected when time (minutes) upon calling is odd number, and "D8" is selected when time (minutes) upon calling is even number. When the state of the cellular telephone set is both "not responded call present" and "newly received mail present", "D4" is selected when time (minutes) upon calling is odd number, and "D8" is selected when time (minutes) upon calling is even number.

As shown in FIG. 12B, when the built-in character #1 is selected and the day corresponds one of the memorial days set by the schedule function, if state of the cellular telephone set is "not responded call present", "D12" is selected irrespective of odd number or even number of the time (minutes) of calling, if the state of the cellular telephone set is "newly received mail present", "D12" is selected irrespective of odd number or even number of the time (minutes) of calling, and if the state of the cellular telephone set is both "not responded call present" and "newly received mail present", "D12" is selected irrespective of odd number or even number of the time (minutes) of calling.

On the other hand, as shown in FIG. 12C, when the built-in character #2 is selected in normal state, if state of the cellular telephone set is "not responded call present", "D16" is selected when time (minutes) upon calling is odd number, and "D20" is selected when time (minutes) upon calling is even number. If the state of the cellular telephone set is "newly received mail present", "D16" is selected when time (minutes) upon calling is odd number, and "D20" is selected when time (minutes) upon calling is even number. When the state of the cellular telephone set is both "not responded call present" and "newly received mail present", "D16" is selected when time (minutes) upon calling is odd number, and "D20" is selected when time (minutes) upon calling is even number.

As shown in FIG. 12D, when the built-in character #2 is selected and the day corresponds one of the memorial days set by the schedule function, if state of the cellular telephone set is "not responded call present", "D24" is selected irrespective of odd number or even number of the time (minutes) of calling, if the state of the cellular telephone set is "newly received mail present", "D24" is selected irrespective of odd number or even number of the time (minutes) of calling, and if the state of the cellular telephone set is both "not responded call present" and "newly received mail present", "D24" is selected irrespective of odd number or even number of the time (minutes) of calling.

Furthermore, as shown in FIG. 12E, when the downloaded character is selected, if state of the cellular telephone set is "not responded call present", "DL-D" is selected irrespective of odd number or even number of the time (minutes) of calling, if the state of the cellular telephone set is "newly received mail present", "DL-D" is selected irrespective of odd number or even number of the time (minutes) of calling, and if the state of the cellular telephone set is both "not responded call present" and "newly received mail present", "DL-D" is selected irrespective of odd number or even number of the time (minutes) of calling. In the foregoing cases, the messages to be displayed become corresponding fixed messages.

As shown in FIG. 8, the foregoing characters and messages are displayed on the message display area 162 and the image display area 163 of the display screen after telephone calling and telephone call arrival. In FIG. 8, as the message, together with the character, one of two messages, "six calls arrived" and "you got mail" is displayed. In case of both of "not responded call" and "newly received call" are present, both messages are displayed simultaneously.

In this case, as the message, it is possible to vary words depending upon kind of the character (difference of the kind such as "standard", "male" and "female" or so forth), or in the alternative, dialec may also be used.

When variation of state of the upper side casing and the lower side casing from the closed condition to the open condition is detected by the casing opening and closing detecting mechanism 19, character presentation is performed. Then, display condition in character display is differentiated depending upon a time of opening of the cellular telephone set. In this case, as shown in FIG. 9, time and date "April 11, 12:34", message "Welcome", and character are displayed. It should be noted that the character is not displayed every time upon opening of the cellular telephone set, and there may be a time zone where character display is not performed.

Preferential order upon character display set forth above is "when not responded call and/or newly received mail present" is given higher preferential order than "when the upper side casing and the lower side casing are changed the state from closed condition to open condition" which is in turn given higher preferential order than "opening and closing in normal state". On the basis of the preferential order, animation of the character is performed. It should be noted that when automatic display or preferential call is set, character presentation when the state of the upper side casing and the lower side casing is changed from the closed state to the open state, is not performed.

In case that the day is the day set as memorial day in the schedule function, the character presentation means 121 displays the particular character. Even when downloaded character is designated, the particular built-in character is displayed on the memorial day.

On the other hand, when the character presentation means 121 performs character presentation even while a sound mode is set. This is because of display for five seconds. The character presentation means 121 may display a message in English words during bilingual mode. The foregoing message is displayed as required information notice since character presentation is performed by the browser.

Figure 13:
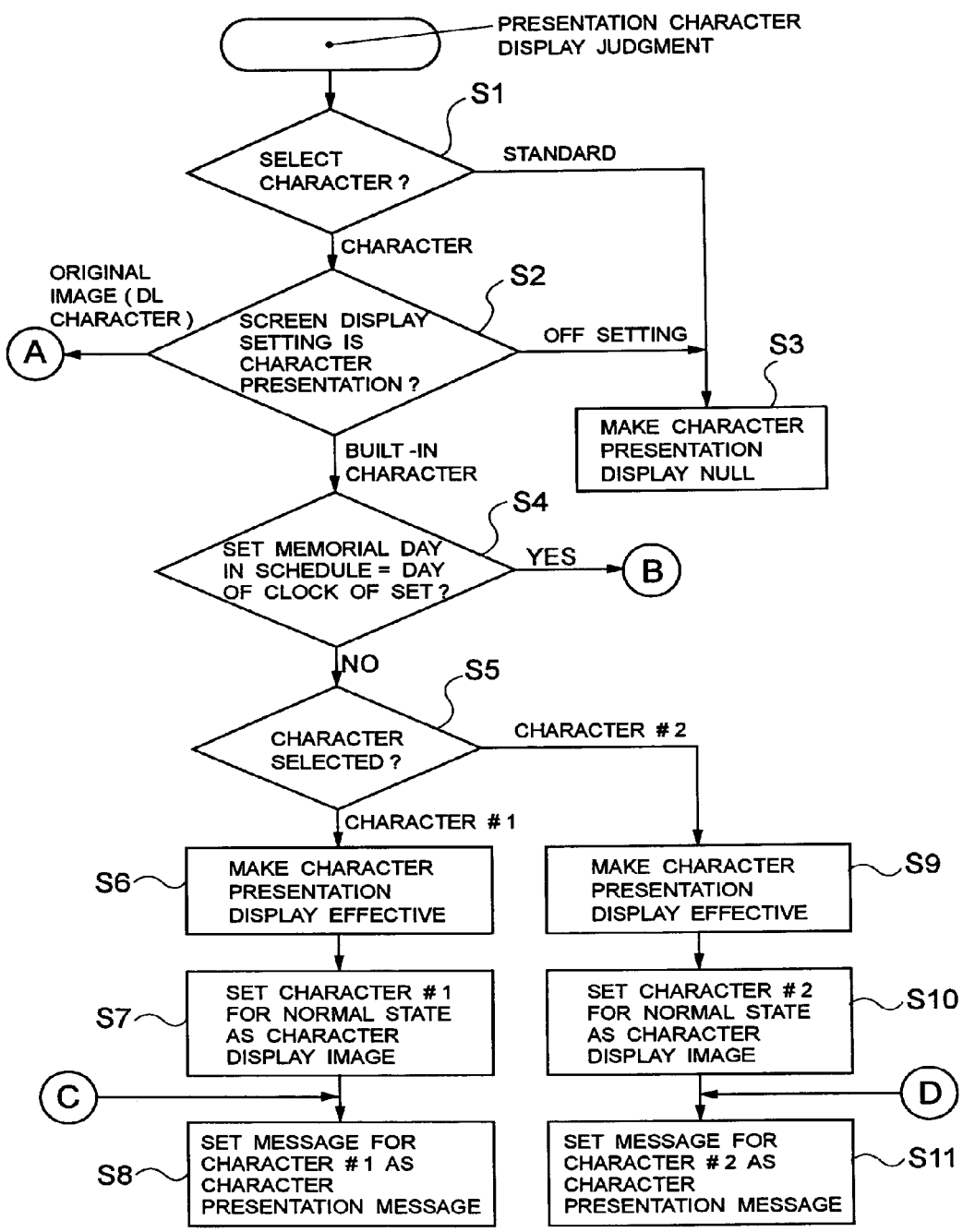
FIG. 13 is a flowchart showing a presentation character display judgment process by the character presentation means of FIG. 1.
Figure 14:
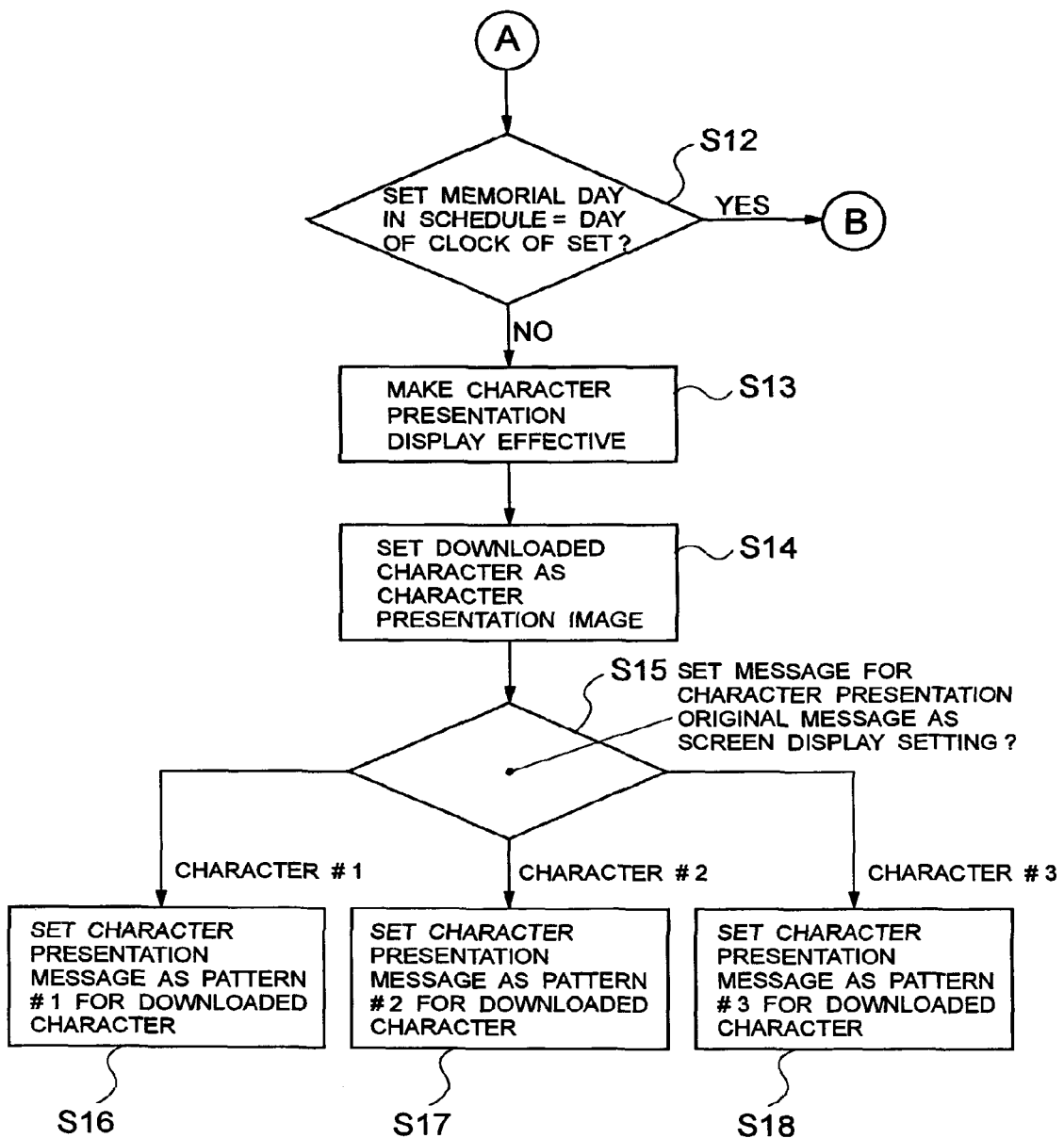
FIG. 14 is a flowchart showing a presentation character display judgment process by the character presentation means of FIG. 1.
Figure 15:
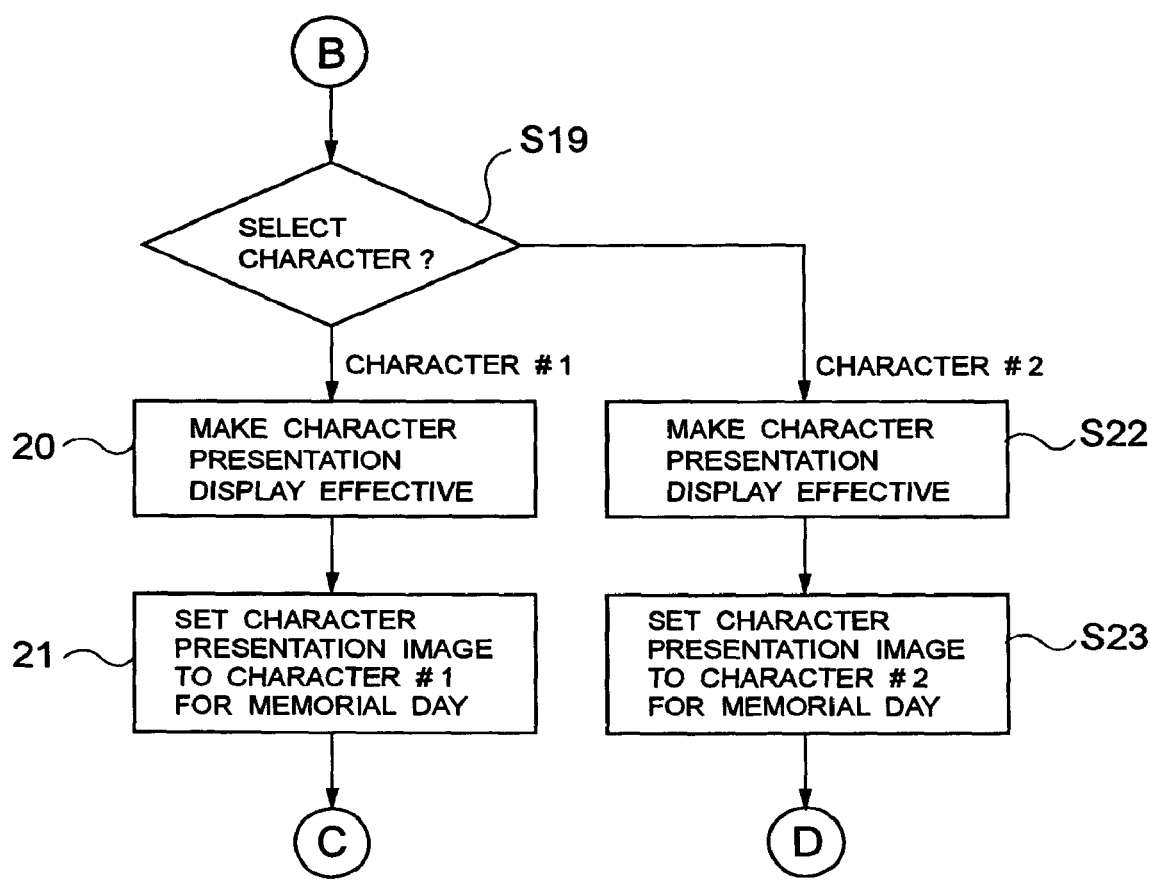
FIG. 15 is a flowchart showing a presentation character display judgment process by the character presentation means of FIG. 1.

FIGS. 13 to 15 are flowchart showing character display judgment process by the character presentation means 121 of FIG. 1. Discussion will be given for character presentation by the character presentation means 121 with reference to FIGS. 13 to 15. It should be noted that the process shown in FIGS. 13 to 15 is realized by executing programs stored in the storage medium 20 by the control portion 12.

The character presentation means 121 is actuated when the control portion detects performing of calling process and call receiving process, changing of state of the upper side casing and the lower side casing from closed state to the open state as detected by the casing opening and closing detection mechanism 19 when not responded call is present or when newly received call present, and changing of state of the upper side casing and the lower side casing from closed state to the open state in the normal state, to execute the following presenting character display judgment process.

Upon performing presenting character display judgment, the character presentation means 121 performs judgment of character selection (step S1 of FIG. 13). If standard is selected, character presentation display is made null (step S3 of FIG. 13).

On the other hand, if the character is selected, the character presentation means 121 performs judgment of character presentation in the screen display setting (step S2 of FIG. 13). In case that setting is made to OFF, character presentation display is made null (step S3 of FIG. 13).

When character presentation in the screen display setting is the built-in character, the character presenting means 121 makes judgment whether "day set as memorial day in the schedule function=day of the clock of the mobile unit" is true or not (step S4 of FIG. 13).

If not "day set as memorial day in the schedule function=day of the clock of the mobile unit" and character #1 is selected in judgment for character selection (step S5 of FIG. 13), the character presentation means 121 makes the character presentation display effective (step S6 of FIG. 13), sets the character presentation image to the character #1 in normal state (step S7 of FIG. 13), and sets the character presentation message to the message for the character #1 (step S8 of FIG. 13).

If character #2 is selected in judgment for character selection (step S5 of FIG. 13), the character presentation means 121 makes the character presentation display effective (step S9 of FIG. 13), sets the character presentation image to the character #2 in normal state (step S10 of FIG. 13), and sets the character presentation message to the message for the character #2 (step S11 of FIG. 13).

If the character presentation in the screen display setting the original image (DL (Down Load) character), the character presentation means 121 makes judgment whether "day set as memorial day in the schedule function=day of the clock of the mobile unit" is true (step S12 of FIG. 14).

If "day set as memorial day in the schedule function=day of the clock of the mobile unit" is not true, the character presentation means 121 makes the character presentation display effective (step S13 of FIG. 14) and the character presentation image is set as the downloaded character (step S14 of FIG. 14).

Subsequently, the character presentation means 121 performs judgment of the message for the character presentation original image in screen display setting (step S15 of FIG. 14). If pattern #1 is selected, the message for character presentation is set to the pattern #1 for the downloaded character (step S16 of FIG. 14), on the other hand, if pattern #2 is selected, the message for character presentation is set to the pattern #2 for the downloaded character (step S17 of FIG. 14), and also, if pattern #3 is selected, the message for character presentation is set to the pattern #3 for the downloaded character (step S18 of FIG. 14).

If "day set as memorial day in the schedule function=day of the clock of the mobile unit" is true at steps S4 and S12, and if judgment of character selection is made as being character #1 (step S19 of FIG. 15), character presentation display is made effective (step S20 of FIG. 15), the character presentation image is set to the character #1 for the memorial day (step S21 of FIG. 15), and the character presentation message is set to the message for the character #1 (step S8 of FIG. 13).

If judgment of character selection is made as being character #2 (step S19 of FIG. 15), character presentation display is made effective (step S22 of FIG. 15), the character presentation image is set to the character #2 for the memorial day (step S23 of FIG. 15), and the character presentation message is set to the message for the character #2 (step S11 of FIG. 13).

As set forth above, in the shown embodiment, it becomes possible to increase number of display patterns of animation display without occupying large storage region in the memory 13 and without performing setting operation every time, by determining any one of three types of appearing characters depending upon number of the same number presenting in calling history (number of calling in the calling history per call recipient) and determining any one of two patterns depending upon the time (minutes) of calling (odd number or even number) by the character presentation means 121.

On the other hand, in the shown embodiment, it becomes possible to increase number of display patterns of animation display without occupying large storage region in the memory 13 and without performing setting operation every time, by determining any one of three types of appearing characters depending upon number of the same number presenting in call arrival history (number of call arrival in the call arrival history per caller) and determining any one of two patterns depending upon the time (minutes) of call arrival (odd number or even number) by the character presentation means 121.

Also, in the shown embodiment, when not responded call is present and/or when newly received mail is present, and when change of state of the upper side casing and the lower side casing from closed state to open state is detected by the casing opening and closing detecting mechanism 19, the character is displayed. At this time, pattern of the character is selected any one of two patterns depending upon time (minutes) of the time of opening of the mobile set (odd number or even number). Thus, it becomes possible to increase number of display patterns of animation display without occupying large storage region in the memory 13 and without performing setting operation every time.

On the other hand, in the shown embodiment, when change of state of the upper side casing and the lower side casing from closed state to open state is detected by the casing opening and closing detecting mechanism 19, the character presentation means 121 performs character presentation. At this time, display condition in character display is selected depending upon time (minutes) of the time of opening of the mobile set. Thus, it becomes possible to increase number of display patterns of animation display without occupying large storage region in the memory 13 and without performing setting operation every time.

It should be noted that while discussion has been given in terms of the foldable type cellular telephone set in the shown embodiment, the present invention is applicable for the cellular telephone set, in which the upper side casing and the lower side casing are integrated, the foldable type cellular telephone set to be opened in left and right sides. On the other hand, in the shown embodiment, discussion has been given concerning method for performing determination of the character based on combination of history information and timing of occurrence, determination of the character may be done depending only on the history information or on the timing of occurrence.

As set forth above, the cellular telephone set according to the present invention which can perform animation display of one of a preliminarily stored plurality of characters, can increase number of display patterns of animation display without occupying large storage region in the memory and without performing setting operation every time by controlling animation display of the character depending upon history information corresponding to the event when occurence of the event on the own terminal is detected.

As set forth above, the cellular telephone set according to the present invention which can perform animation display of one of a preliminarily stored plurality of characters, can increase number of display patterns of animation display without occupying large storage region in the memory 13 and without performing setting operation every time by controlling animation display depending upon occurrence time of predetermined operation associating with the event when occurence of event on the own terminal is detected.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A cellular telephone set capable of performing animation display of any one of a preliminarily stored plurality of characters, comprising:
    character presentation means, upon detection of an event on the cellular telephone set, for controlling animation display of said character depending upon an occurrence timing of a predetermined operation relating to said event,
    wherein said character presentation means controls the animation display of said character depending upon particular date and time information preliminarily set in a schedule function, and
    in the case that a day is corresponding to the particular date set as the memorial day in the schedule function, said character presentation means performs the animation display of the particular character preliminarily stored,
    wherein said character presentation means controls the animation display of said character so as to differentiate patterns depending upon odd number and even number of an occurrence time of said predetermined operation.

2. A character display presentation method of a cellular telephone set capable of performing animation display of any one of a preliminarily stored plurality of characters, comprising:
    a first step of detecting an event on the cellular telephone set, and a second step of, upon detection of the event, controlling animation display of said character depending upon an occurrence timing of a predetermined operation relating to said event,
    wherein in said second step, the animation display of said character is controlled depending upon particular date and time information preliminarily set in a schedule function, and
    in the case that a day is corresponding to the particular date set as the memorial day in the schedule function, said second step performs the animation display of the particular character preliminarily stored,
    wherein in said second step, the animation display of said character is controlled so as to differentiate patterns depending upon odd number and even number of an occurrence time of said predetermined operation.

3. A non-transitory storage medium storing a program for executing a character display presentation method of a cellular telephone set capable of performing animation display of any one of a preliminarily stored plurality of characters on a computer, comprising:
    a first process of detecting an event on the cellular telephone set, and a second process of, upon detection of the event, controlling animation display of said character depending upon an occurrence timing of a predetermined operation relating to said event,
    wherein in said second process, the animation display of said character is controlled depending upon particular date and time information preliminarily set in a schedule function, and
    in the case that a day is corresponding to the particular date set as the memorial day in the schedule function, said second process performs the animation display of the particular character preliminarily stored,
    wherein in said second process, the animation display of said character is controlled so as to differentiate patterns depending upon odd number and even number of an occurrence time of said predetermined operation.

* * * * *